Figure 1:
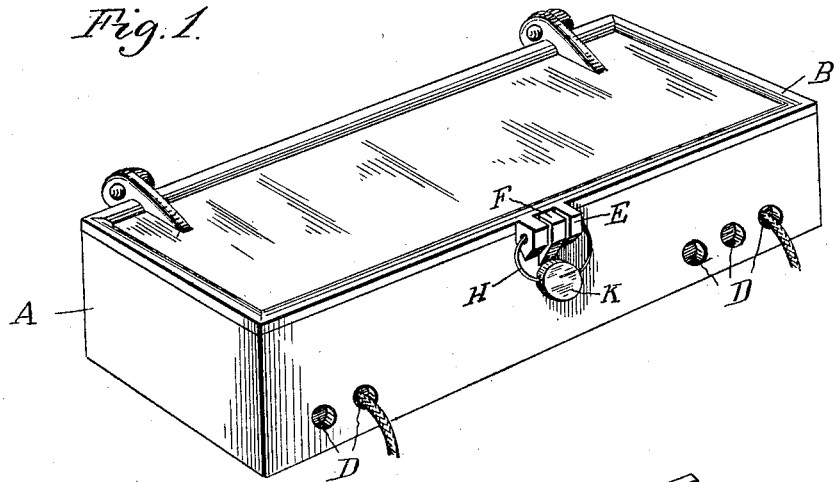

No. 699,483. Patented May 6, 1902.
T. H. BRADY.
ELECTRICAL APPARATUS.
(Application filed July 20, 1901.)

(No Model.)

Witnesses
C. F. Kilgore
D. Kuimundahl

Inventor
Thomas H. Brady
G. [signature]
Attorneys

UNITED STATES PATENT OFFICE.

THOMAS H. BRADY, OF NEW BRITAIN, CONNECTICUT.

ELECTRICAL APPARATUS.

SPECIFICATION forming part of Letters Patent No. 699,483, dated May 6, 1902.

Application filed July 20, 1901. Serial No. 69,167. (No model.)

*To all whom it may concern:*

Be it known that I, THOMAS H. BRADY, a citizen of the United States, and a resident of New Britain, in the county of Hartford and State of Connecticut, have invented certain new and useful Improvements in Electrical Apparatus, of which the following is a description whereby any one skilled in the art can make and use the same.

It is customary practice in selling electricity for commercial purposes, lighting, &c., to measure the quantity consumed by a meter which is located in some convenient part of the building or room. When the use of the current is stopped, the meters are generally removed for use in other places and the wires are thus left exposed, so that it is possible for a person to connect them up again without a meter, and so use the current without paying for it.

My invention has for its object to so protect the ends of the wires after the meter has been removed that they cannot be tampered with or connected up with lights or motors or other apparatus.

I have shown a preferred form of construction in the drawings which are annexed hereto and are a part of this application, in which—

Figure 2:
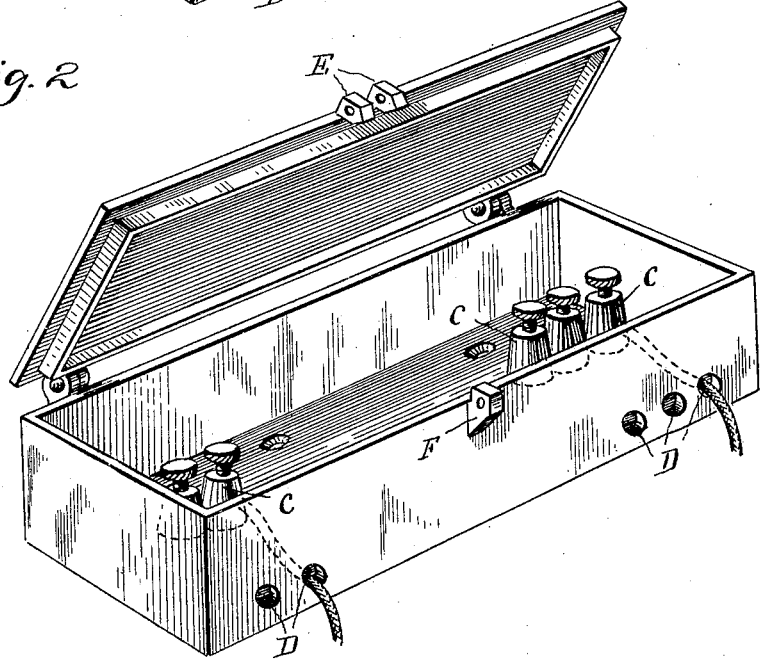

Figure 1 is a perspective view of the apparatus closed, and Fig. 2 is a perspective view of the apparatus open.

This apparatus which I show consists of a metallic box A, having a cover B. On the inside of the box are arranged binding-posts C, and these are preferably cast integral with the box, so that they cannot be tampered with or removed from the outside. Through the side of the box are formed holes D, through which the wires are passed, their ends being secured to the binding-posts. When the meter is taken out, one of these boxes is put up in its place. The ends of the wires are passed through the holes in the side of the box and secured to the binding-posts. The cover is then put in position and sealed in some manner. A simple form is shown in the drawings comprising the slotted lug E on the cover and the projection F on the box, which enters the slot in the lug E when the cover is closed. A hole is formed through the two branches of the lug E and the projection F, and through this hole is passed the wire H, the ends of which may be secured in the seal K. This prevents any tampering with the wires by unauthorized parties.

For convenience in designating an apparatus of this kind I will in the claims call it a "meter-box."

I claim as my improvement—

1. A meter-box provided with apertures for the wires, and binding-screws within and integral with said box to receive and retain the ends of said wires, substantially as described.

2. A metallic meter-box provided with apertures for the wires, binding-screws formed integral with said box, and a cover therefor, substantially as described.

THOMAS H. BRADY.

Witnesses:
 D. C. KUNNENDAHL,
 F. M. BRAGG.